United States Patent [19]

Pollak

[11] Patent Number: 5,418,011
[45] Date of Patent: May 23, 1995

[54] PROCESS FOR PRODUCING CARBON BODIES HAVING A SILICON CARBIDE COATING

[75] Inventor: Wolfgang Pollak, Selb, Germany

[73] Assignee: Hoechst CeramTec Aktiengesellschaft, Selb, Germany

[21] Appl. No.: 864,875

[22] Filed: Apr. 6, 1992

[30] Foreign Application Priority Data

Apr. 6, 1991 [DE] Germany ............ 41 11 190.7

[51] Int. Cl.⁶ .................................... B05D 3/02
[52] U.S. Cl. ................................ 427/226; 427/228; 427/343; 427/379; 427/419.7; 427/443.2
[58] Field of Search ............ 427/228, 379, 226, 443.2, 427/419.7, 344, 343

[56] References Cited

U.S. PATENT DOCUMENTS

| | | | |
|---|---|---|---|
| 3,079,273 | 2/1963 | Johnson | 427/228 |
| 3,140,193 | 7/1964 | Kane . | |
| 3,189,477 | 6/1965 | Shafer | 427/228 |
| 3,275,471 | 9/1966 | Lowell et al. . | |

FOREIGN PATENT DOCUMENTS 0133315 2/1985 European Pat. Off. .

*Primary Examiner*—Janyce Bell
*Attorney, Agent, or Firm*—Foley & Lardner

[57] ABSTRACT

A process is described for producing carbon bodies and a coating of silicon-infiltrated silicon carbide. In this process, the surface of carbon bodies is coated with an aqueous slip containing finely divided silicon carbide and binder. The coating is then dried and the binder is decomposed by heat. The coated carbon bodies are then silicized at their surface by contact with liquid silicon.

9 Claims, No Drawings

PROCESS FOR PRODUCING CARBON BODIES HAVING A SILICON CARBIDE COATING

BACKGROUND OF THE INVENTION

The present invention relates to carbon bodies whose surfaces are covered with a layer of silicon-infiltrated silicon carbide (=SiSiC) and to a process for producing them starting from carbon components.

Graphite pebbles are used, inter alia, in nuclear-power engineering. In this connection it is troublesome that, as a result of the low hardness of the graphite, finely divided abraded material is produced in large amounts if the pebbles are subjected to mechanical shear forces. Furthermore, graphite components are used in electric furnaces in the presence of liquid silicon in the production of SiSiC bodies. These include, for example, combustion aids, heating elements and structural components in the graphite heating zone. In this case, it is a disadvantage that graphite in direct contact with molten elemental silicon reacts to form silicon carbide. The liquid silicon passes through the relatively large pore system of the graphite which is, for example, protruded, into the carbon body and is exothermically converted into silicon carbide. The larger the pore system and the particle size are, the better liquid silicon is able to post-diffuse. Since the silicon carbide formed takes up more space than the reacting carbon because of its crystal structure, this results in the formation of cracks and splits on the component. Disadvantageously, this mechanism leads to complete destruction of the component within a very short time.

However, graphite bodies which are produced by an iso-static pressing process and have a comparatively high density, a fine-grained structure and low porosity behave differently. These graphite bodies react in principle in the same way towards liquid silicon; after a first reaction at the surface of the graphite to form silicon carbide, the narrow pore channels, however, suppress a further post-diffusion of silicon into the interior of the component since the increase in volume accompanying the reaction reduces the pore system or seals it completely. Such graphite grades are, however, not available in all component dimensions and, in addition, are substantially more expensive.

SUMMARY OF THE INVENTION

The object of the invention is to form porous carbon bodies in such a way that they are insensitive to the action of molten silicon and are durable.

Attempts have already been made to coat components made of porous carbon with silicon carbide only at the surface by direct contact with liquid silicon during the infiltration firing of SiSiC components with excess silicon, but in this process a uniform, closed silicon carbide layer was not formed but substantial splits and component cracks resulted. Further attempts to seal the surface of porous graphite pebbles with a mixture of soot and fine graphite powder with and without binder yielded the result that a uniform layer thickness cannot be achieved in this way either. The layers applied exhibited poor adhesion to the graphite. Splitting on contact with liquid silicon could not be prevented.

Surprisingly, a process has now been found for producing carbon bodies of the generic type mentioned in the introduction with an SiSiC surface, which comprises coating the surface of carbon bodies with an aqueous slip containing finely divided silicon carbide and binder, allowing the slip to dry, destroying the binder by heating and silicizing the coating on the carbon bodies by contact with liquid silicon.

DETAILED DESCRIPTION OF THE PREFERRED EMBODIMENTS

Preferably, the carbon bodies are composed of graphite. Particularly suitable are all graphite bodies which can be produced by common processes such as pultrusion, dry pressing, isostatic pressing etc. The process according to the invention is particularly well-suited for coating moldings having an irregular geometry. The slips used according to the invention preferably also contain carbon in finely divided form, in particular soot, and graphite in combination, preferably in the ratio of 1:1. The proportion of silicon carbide in the slip should be as high as possible and the proportion of carbon should be calculated in such a way that the free volume available after the destruction of the binder is theoretically calculated to be filled with freshly formed silicon carbide during the silicizing. Slip compounds made up in this way are already known, for example in the production of SiSiC burner tubes.

It is possible that carbon is also formed during the decomposition of the binder. This applies, for example, to aromatic resins as binders.

Depending on whether the slip layer is applied uniformly or nonuniformly, the layer thickness of the silicon carbide coating on the surface of the carbon body also varies. Preferably, the thickness of the slip layer and, consequently, also that of the silicon carbide layer on the surface of the carbon body is in the range from 0.1 to 5 mm.

Surprisingly, the surface reaction of the carbon parent body with Si to form SiC produces a strong material composite. The applied and infiltrated SiSiC layer can be variably modified in different ways on the component according to requirement by a subsequent mechanical machining or by an additional partial slip application in the green and also in the fired state. By incipiently grinding the coated graphite body, for example, bodies are produced which have, inter alia, a flat graphite surface. A graphite body (after coating with SiC slip) can be joined to a second graphite body or an SiSiC body. In this joining technique, an all-round slip coating is responsible for the green strength of the composite body after it has dried. After infiltration with silicon, the joining SiC slip layer is converted into SiSiC which ensures a joint to graphite which is strong on both sides, on the one hand, and to graphite or SiSiC, on the other hand. Incipient grinding produces bodies therefrom which, inter alia, have flat graphite and SiSiC surfaces.

The physical properties of the composite body can be varied by means of the thickness and the composition of the slip layer.

The bodies obtained have the same good resistance to molten silicon as high-density graphite grades. The wear and erosion strength, the corrosion resistance to most acids and alkaline solutions, the insensitivity to thermal stresses, the high thermal conductivity and the high degree of hardness of the SiSiC open up, according to the invention, new technical application possibilities for the graphite components. Defects due to machining, cracks, pores, wear or chips can be repaired both in the green state of the components and in the fired state by applying slip, machining and then infiltrating Si.

Graphite components normally oxidize at temperatures above 400° C. However, if such components are sealed, according to the invention, with a homogeneous SiSiC layer, the possible application temperature in an oxidizing atmosphere is increased to approximately 1400° C. In oxidizing rapid firings in the ceramics industry, it is possible to use, for example, carbon firing panels which have the advantageous high thermal shock resistance and elasticity of graphite.

The process according to the invention enables graphite bodies in general, in particular, however, coarse-grained and porous graphite bodies, to be sealed or armored with an SiSiC layer in vacuo in a cost-effective manner, without special appliances and without the components being destroyed in the process.

I claim:

1. A process for producing carbon bodies having a coating of silicon-infiltrated silicon carbide, which comprises the steps of:
   coating the surface of coarse-grained and porous carbon bodies with an aqueous slip containing water, finely divided silicon carbide, a binder, and finely divided carbon;
   allowing the slip to dry;
   destroying the binder by heating; and
   silicizing the coating on the carbon bodies by contact with liquid silicon.

2. The process as claimed in claim 1, wherein the step of coating the surface of carbon bodies includes coating a graphite carbon body with slip.

3. The process as claimed in claim 1, wherein a combination of soot and graphite is added as carbon.

4. The process as claimed in claim 1, wherein an organic binder is added as binder.

5. The process as claimed in claim 3, wherein the slip contains soot and graphite in a ratio of 1:1.

6. The process as claimed in claim 1, which further comprises the step of forming a slip layer on the surface of the carbon bodies in a range of from 0.1 to 5 mm.

7. The process as claimed in claim 1, wherein the coating step includes coating the surface of the carbon bodies with carbon provided in an amount sufficient to fill a free volume available after the destruction of the binder with freshly formed silicon carbide during the silicizing.

8. The process as claimed in claim 1, wherein the coating step includes coating the carbon bodies with the slip containing an aromatic resin as the binder.

9. A process for producing carbon bodies having a coating of silicon-infiltrated silicon carbide, which comprises the steps of:
   coating the surface of coarse-grained and porous graphite carbon bodies with an aqueous slip containing water, finely divided silicon carbide, a binder, and finely divided carbon;
   allowing the slip to dry;
   destroying the binder by heating; and
   creating on the graphite carbon bodies a dense layer of SiSiC, which prevents oxidation of the graphite at temperatures of 1400° C. by silicizing the coating on the graphite carbon bodies by contact with liquid silicon.

* * * * *